United States Patent
Ueno et al.

(10) Patent No.: US 7,322,182 B2
(45) Date of Patent: Jan. 29, 2008

(54) FILTER REGENERATION CONTROL

(75) Inventors: Shouichirou Ueno, Yokohama (JP);
Jun-ichi Kawashima, Yokosuka (JP);
Masahiko Nakano, Machida (JP);
Terunori Kondou, Yokohama (JP);
Makoto Otake, Yokohama (JP); Naoya Tsutsumoto, Yokohama (JP);
Toshimasa Koga, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 34 days.

(21) Appl. No.: 11/013,473

(22) Filed: Dec. 17, 2004

(65) Prior Publication Data

US 2005/0143899 A1    Jun. 30, 2005

(30) Foreign Application Priority Data

Dec. 19, 2003  (JP)  ............................. 2003-422640

(51) Int. Cl.
*F01N 3/00*    (2006.01)
(52) U.S. Cl. ..................... 60/295; 60/274; 60/277; 60/286; 60/297
(58) Field of Classification Search .............. 60/274, 60/277, 278, 280, 286, 295, 297, 300, 311
See application file for complete search history.

(56) References Cited

U.S. PATENT DOCUMENTS

| | | | |
|---|---|---|---|
| 5,195,316 A | | 3/1993 | Shinzawa et al. |
| 5,195,318 A | * | 3/1993 | Shinzawa et al. ............. 60/285 |
| 6,405,528 B1 | * | 6/2002 | Christen et al. ............. 60/295 |
| 6,568,173 B1 | * | 5/2003 | Kolmanovsky et al. ....... 60/280 |
| 6,952,918 B2 | * | 10/2005 | Imai et al. .................... 60/295 |
| 6,966,178 B2 | * | 11/2005 | Saito et al. .................... 60/295 |
| 6,973,778 B2 | * | 12/2005 | Kondou et al. ................ 60/295 |
| 7,047,729 B2 | * | 5/2006 | van Nieuwstadt et al. .... 60/286 |
| 2004/0226288 A1 | | 11/2004 | Okugawa et al. |

FOREIGN PATENT DOCUMENTS

| | | |
|---|---|---|
| EP | 1 375 877 A2 | 1/2004 |
| EP | 1 437 492 A1 | 7/2004 |
| EP | 1 455 070 A2 | 9/2004 |
| JP | 10-061429 A | 3/1998 |
| JP | 10-068315 A | 3/1998 |
| JP | 11-107837 A | 4/1999 |

* cited by examiner

*Primary Examiner*—Binh Q. Tran
(74) *Attorney, Agent, or Firm*—Foley & Lardner LLP (57) ABSTRACT

A regeneration control device which regenerates a filter (4) which traps particulate matter in the exhaust gas of an engine (1) is disclosed. The regeneration control device includes a first temperature sensor (16, 17), which detects one of an upstream temperature and a downstream temperature upstream and downstream of the filter (4) as a first temperature (Tin, Tout); a second temperature sensor (16, 17), which detects the other temperature as a second temperature (Tin, Tout); and a microcomputer. The microcomputer programmed to compute an estimated value (Tbede2) for the second temperature based on the first temperature detected by the first temperature sensor (16, 17), compute an estimated bed temperature (Tbed2) of the filter based on the second temperature detected by a second temperature sensor (16, 17) and the estimated value (Tbede2) for the second temperature, and perform engine control for increasing the temperature of the exhaust gas based on the estimated bed temperature (Tbed2).

15 Claims, 5 Drawing Sheets

FILTER REGENERATION CONTROL

FIELD OF THE INVENTION

This invention relates to an exhaust purification device of a diesel engine, and regeneration of a diesel particulate filter.

BACKGROUND OF THE INVENTION

Tokkai10-68315, published by Japan Patent Office in 1998, discloses an exhaust purification device which has a filter or NOx reduction catalyst in the exhaust passage. In order to maintain the filter/catalyst in a suitable temperature region, the temperature of the filter/catalyst is estimated, and the exhaust gas flowrate flowing through the filter/catalyst is controlled based on the estimated temperature. In this conventional technology, an estimated catalyst temperature Tc is computed by the following equation from an exhaust gas temperature Tg1 at the inlet of the filter/catalyst, and an exhaust gas temperature Tg2 at the outlet of the filter/catalyst: $Tc = p \times Tg1 + q \times Tg2$ (p and q are coefficients obtained from experiment).

SUMMARY OF THE INVENTION

However, the response delay (due to the heat capacity of the filter) of the outlet temperature rise relative to the inlet temperature rise, and the effect of the temperature rise due to filter regeneration, has to be reflected in the estimated filter temperature by only two coefficients, p and q. Therefore, a very large amount of time is required to find the two coefficients, p and q, by experiment under various filter or engine operating conditions. The map which supplies the two coefficients for various filter or engine operating conditions is very large, and the data volume of the map is large. Further, if the filter supports an oxidation catalyst, it is necessary to take the effect of the temperature rise of the oxidation catalyst into account in the estimated filter temperature.

If the two coefficients, p and q, are made constants under various operating conditions for simplicity, the precision of catalyst temperature estimation falls. In this case, the filter will be in an abnormally hot state during filter regeneration, and deterioration of the oxidation catalyst and melting of the filter will occur.

An object of this invention is to provide a regeneration control device which can precisely estimate the bed temperature of the filter in a simple manner.

In order to achieve the above object, this invention provides a regeneration control device which regenerates a filter which traps particulate matter in the exhaust gas of an engine, comprising a first temperature sensor, which detects one of an upstream temperature and a downstream temperature upstream and downstream of the filter as a first temperature, a second temperature sensor, which detects the other temperature as a second temperature, and a microcomputer. The microcomputer is programmed to compute an estimated value for the second temperature based on the first temperature detected by the first temperature sensor, compute an estimated bed temperature of the filter based on the second temperature detected by a second temperature sensor and the estimated value for the second temperature, and perform engine control for increasing the temperature of the exhaust gas based on the estimated bed temperature.

The details as well as other features and advantages of this invention are set forth in the remainder of the specification and are shown in the accompanying drawings.

DESCRIPTION OF THE PREFERRED EMBODIMENTS

Figure 1:
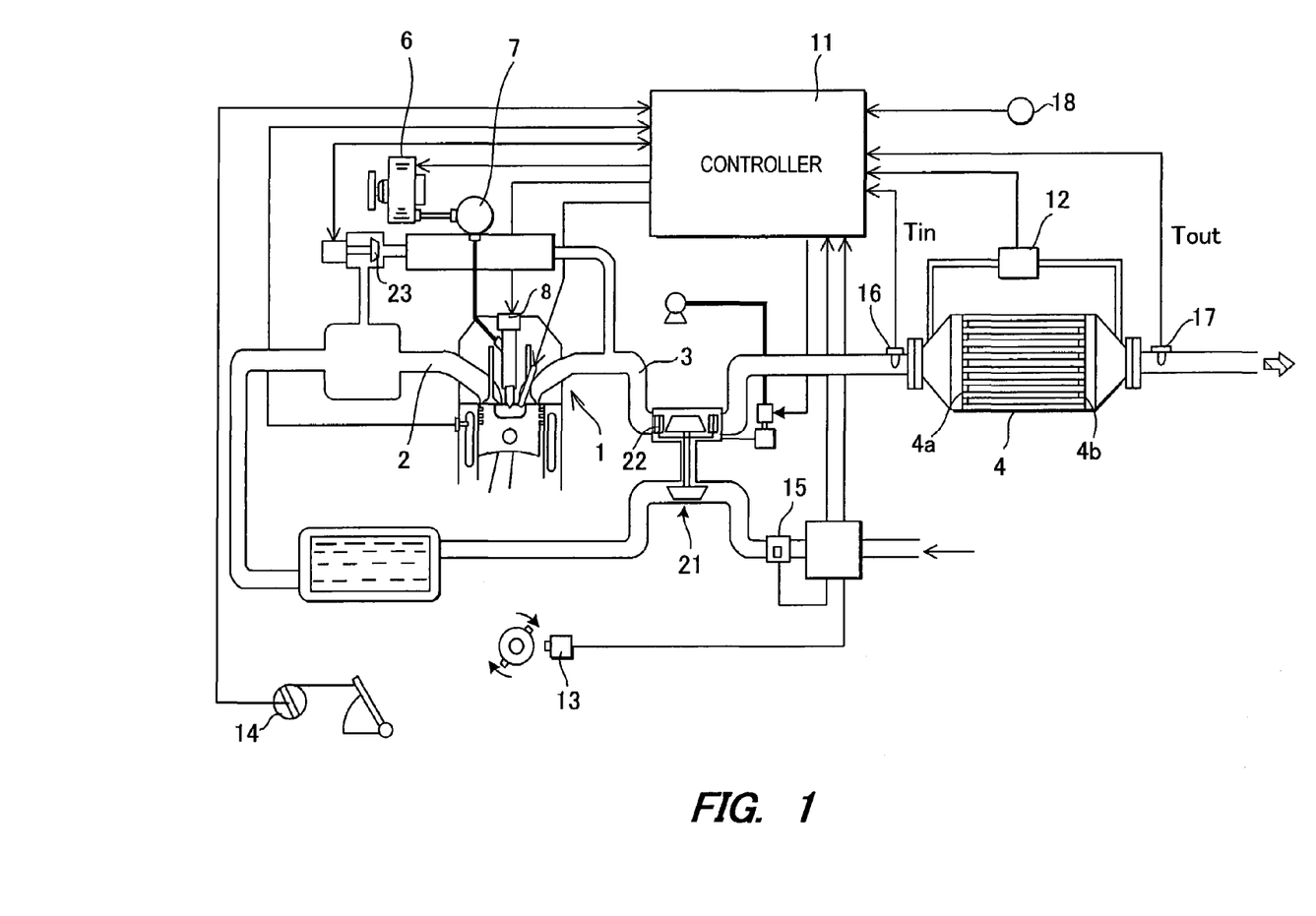
FIG. 1 is a schematic diagram showing an engine system according to an embodiment.

Referring to FIG. 1, an engine system fitted with an exhaust purification device comprises a diesel engine 1, an intake passage 2 and an exhaust passage 3.

A fuel injection device is a common rail type injection device comprising a supply pump 6, a common-rail 7 and an injector 8. A controller 11 is a microcomputer-based engine controller, and performs fuel injection control. The controller 11 comprises a microcomputer which has a central processing unit (CPU), random access memory (RAM), read-only memory (ROM), and input and output (I/O) interface.

To prevent smoking near full load, a maximum injection amount Qfmax is determined based on a cylinder intake air amount Qac and engine rotation speed Ne. The cylinder intake air amount Qac is computed from the output of an air flow meter 15, and the engine rotation speed Ne is detected from an engine rotation speed sensor 13. A basic injection fuel amount determined according to the accelerator pedal stroke is limited by the maximum injection amount Qfmax, and control is performed so that the fuel injection device injects a limited fuel injection amount Qf at an optimal timing. The accelerator pedal stroke is detected by an accelerator pedal sensor 14.

A filter 4 which traps particulates in the exhaust gas is provided in an exhaust passage 3. When the trap amount (deposition amount) of particulates in the filter 4 reaches a predetermined value, the controller 11 performs engine control to increase the exhaust gas temperature in order to burn and remove the particulates. The carrier (or catalyst support) of the filter 4 supports an oxidation catalyst which removes HC and CO in the exhaust gas. The carrier of the filter 4 is made of ceramic or metal.

A differential pressure sensor 12 detects a pressure loss (or a pressure difference) between upstream and downstream of the filter 4. The differential pressure sensor 12 is provided in a differential pressure detection passage which bypasses the filter 4.

The pressure loss of the filter 4 detected by the differential pressure sensor 12 is sent to a controller 11, and the controller 11 performs regeneration control of the filter 4 based on the pressure loss of the filter 4. Specifically, the controller 11 compares a pressure loss ΔP which was detected before regeneration control and a regeneration start threshold, and when the pressure loss ΔP is larger than the regeneration start threshold, it is determined that the timing is a regeneration start timing. When the timing is the regeneration start timing, the controller 11 increases the exhaust gas temperature, and starts regeneration control of the filter 4. The controller 11 also compares the pressure loss ΔP during regeneration control with a regeneration end threshold, and when the pressure loss ΔP is smaller than the regeneration start threshold, it is determined that the timing is a regeneration end timing, and the controller 11 terminates regeneration control.

The regeneration control of the filter 4 increases exhaust gas temperature by delaying the injection timing of the fuel injected from a fuel injection device more than usual, or by performing an additional injection (post-injection) after the usual injection.

The controller 11 estimates the bed temperature of the filter 4 based on temperature characteristics which physically model the filter 4 during regeneration control of the filter 4, and the filter inlet temperature Tin and filter outlet temperature Tout, assuming that regeneration control of the filter 4 is performed as mentioned above. The controller 11 performs regeneration control of the filter 4, while maintaining the estimated bed temperature below a filter critical temperature. This is because deterioration of the oxidation catalyst and melting of the filter may occur above the filter critical temperature.

Figure 2:
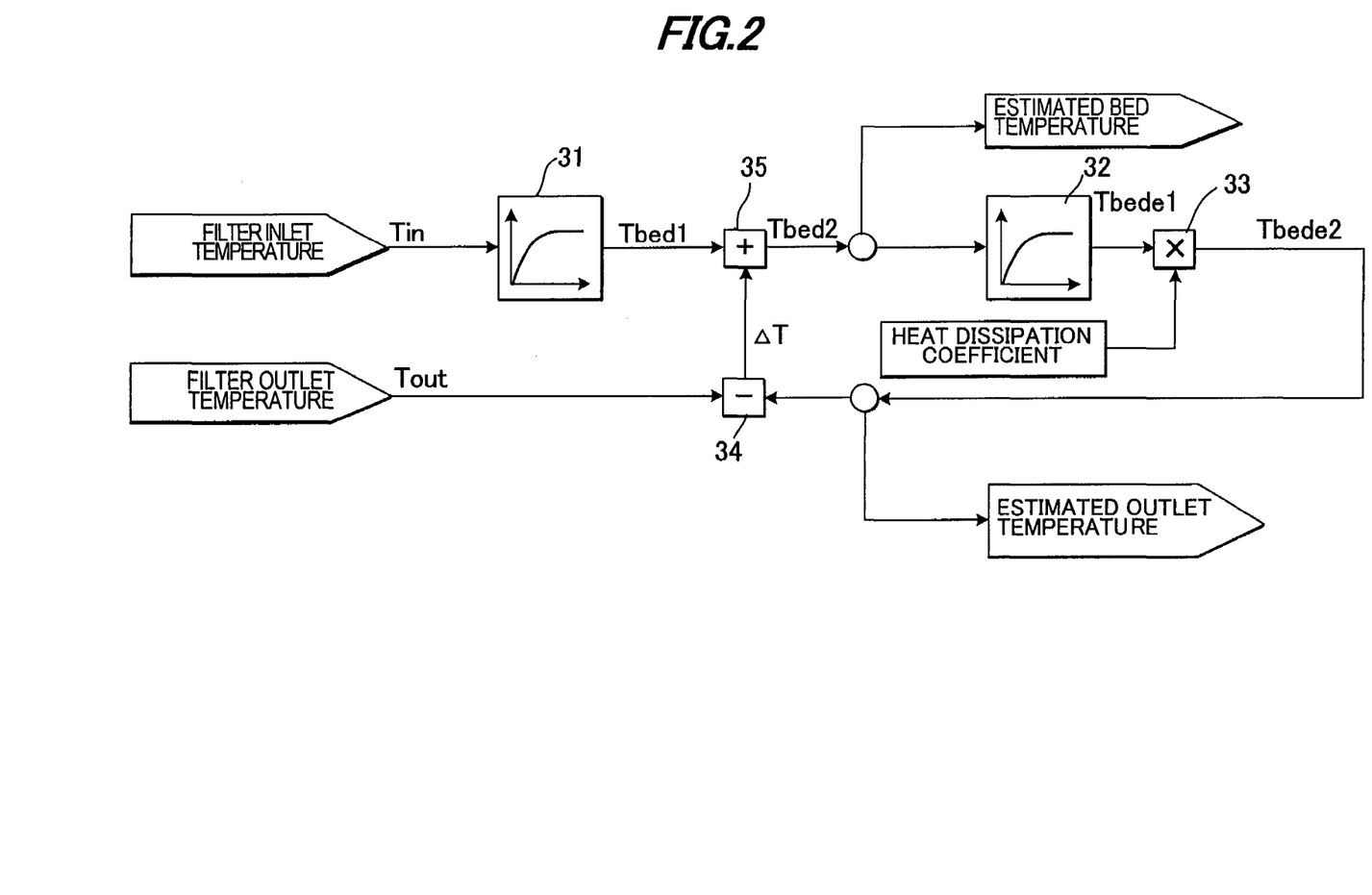
FIG. 2 is a block diagram showing an estimated bed temperature computation routine.

FIG. 2 represents an estimated bed temperature computation section which shows the computation routine performed by the controller 11 as a block diagram. The estimated bed temperature computation section calculates an estimated bed temperature Tbed2. The estimated bed temperature computation section comprises weighted average sections 31, 32, a multiplication section 33, a subtraction section 34 and an addition section 35. The controller 11 repeatedly performs the computation routine represented by the sections 31-35 at a predetermined computation interval. The predetermined computation interval may be 20 microseconds, for example. For example, the controller 11 repeats the computation routine by a timer interruption at every predetermined computation interval. Each section represents a computing function of the controller 11.

The weighted average section 31 computes a temporary bed temperature Tbed1 of the filter 4 from the filter inlet temperature Tin detected by a temperature sensor 16 by equation (1), and stores it in a memory (e.g. RAM):

$$Tbed1 = Tin \times K1 + Tbed1(\text{immediately preceding value}) \times (1-K1) \quad (1)$$

Herein, K1 is a weighted average coefficient, and Tbed1 (immediately preceding value) is a value of Tbed1 which is calculated and stored on the immediately preceding computation of Tbed1. The weighted average section 31 computes the weighted average of the filter inlet temperature Tin and the temporary bed temperature Tbed1 computed previously (specifically, on the immediately preceding computing occasion). Equation (1) is an equation which computes a temperature which varies with a first order delay relative to the filter inlet temperature Tin as the temporary bed temperature Tbed1 of the filter 4. The temporary bed temperature Tbed1 does not include the temperature rise amount due to a chemical reaction in the filter, such as oxidation of the deposited particulates and catalytic oxidation of HC and CO.

In the substantially cylindrical filter 4, engine exhaust gas flows into a filter rear surface 4b from a filter front surface 4a in the axial direction of the filter (left-right direction of FIG. 1). Therefore, in general, the "bed temperature" of the filter 4 ranges from a temperature at a position near the filter front surface 4a (close to the filter inlet temperature Tin) to a temperature at a position near the filter rear surface 4b (close to the filter outlet temperature Tout). In this description, the highest temperature displayed between the filter front surface 4a and the filter rear surface 4b is defined as the "bed temperature". The highest temperature is usually achieved at a position downstream from the center of the filter 4 in the axial direction.

As the increase (or variation) of bed temperature is delayed with respect to the increase (or variation) of the filter inlet temperature Tin by the heat capacity from the filter front surface 4a to the position at the highest temperature (hereafter, "maximum temperature position"), equation (1) approximates this delay as a first-order delay. In other words, equation (1) represents the temperature characteristics of the maximum temperature position as a physical model. The adjustment parameter in equation (1) is a weighted average coefficient K1, and the weighted average coefficient K1 is determined based on the heat capacity from the filter front surface 4a to the maximum temperature position.

The weighted average section 32 computes a temporary estimated outlet temperature Tbede1 of the filter 4 by the following equation from the temporary bed temperature Tbed1, and stores it in the memory (e.g. RAM):

$$Tbede1 = Tbed1 \times K2 + Tbede1(\text{immediately preceding value}) \times (1-K2) \quad (2)$$

Herein, K2 is a weighted average coefficient, and Tbede1 (immediately preceding value) is a value of Tbede1 which is calculated and stored in the immediately preceding computation of Tbede1. The weighted average section 32 computes the weighted average of the temporary bed temperature Tbed1 and the temporary estimated outlet temperature Tbede1 computed previously (specifically, on the immediately preceding computing occasion).

Equation (2) is an equation which computes a temperature which varies with a first order delay relative to the temporary bed temperature of the filter 4, as the temporary estimated outlet temperature Tbede1 of the filter 4. The increase (or variation) of outlet temperature of the filter 4 is delayed with respect to the increase (or variation) of the bed temperature by the heat capacity from the maximum temperature position to the filter rear surface 4b, and equation (2) approximates this delay as a first-order delay. In other words, equation (2) represents the temperature characteristics of the filter rear surface 4b as a physical model. Therefore, also in equation (2), the adjustment parameter is the weighted average coefficient K2, and the weighted average coefficient K2 is determined based on the heat capacity from the maximum temperature position to the filter rear surface 4b.

The multiplication section 33 computes an estimated outlet temperature Tbede2 of the filter 4 by the following equation:

$$Tbede2 = Tbede1 \times K3 \quad (3)$$

Herein, K3 is the heat dissipation coefficient of the filter.

Figure 3:
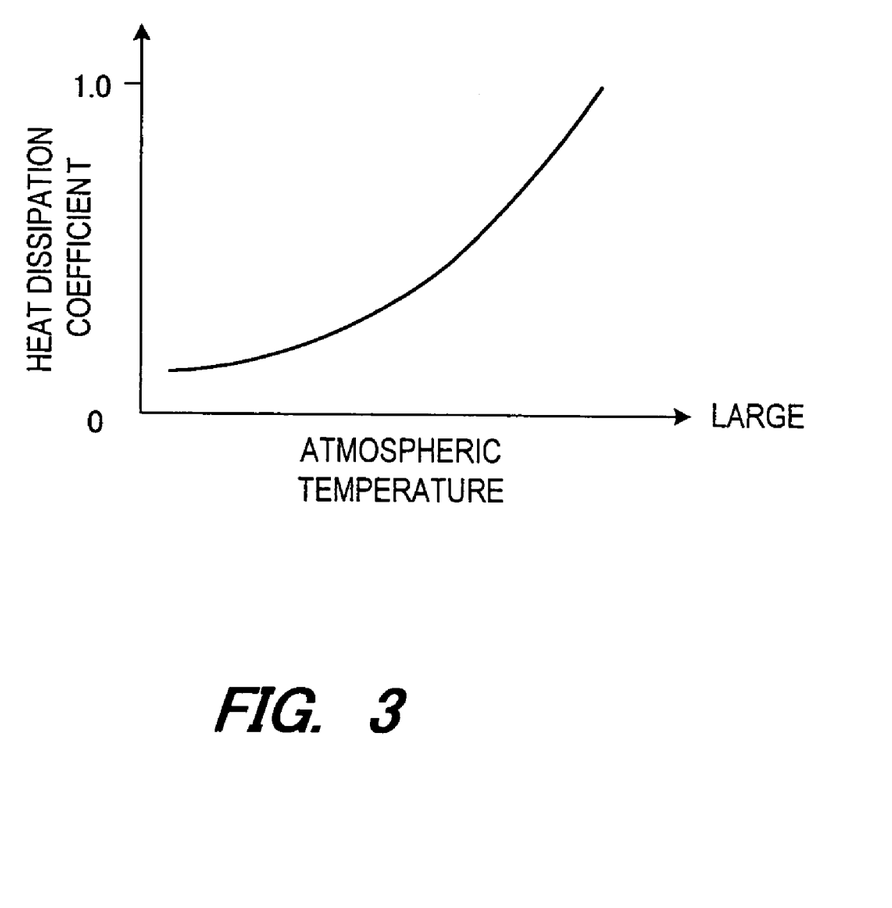
FIG. 3 shows the outside temperature dependence of a heat dissipation coefficient.

As the temperature of the air surrounding the filter 4 is atmospheric temperature (outside air temperature), heat dissipation takes place from the hot carrier of the filter 4 to the outside air. Therefore, equation (3) reflects that the outlet temperature and bed temperature fall due to the heat taken from the carrier of the filter 4 to the outside air. It should be noted that the computation of the temporary estimated outlet temperature Tbede1 ignores the heat dissipation from the filter 4. The heat dissipation coefficient K3 of equation (3) is a positive value less than 1.0. As shown in FIG. 3, the heat dissipation coefficient K3 varies according to the outside temperature. As the heat taken from the bed of the filter 4 also increases the lower the outside temperature is, the heat dissipation coefficient K3 is smaller, the lower the outside temperature is. The ambient temperature is detected by a temperature sensor 18.

The subtraction section 34 subtracts the estimated outlet temperature Tbede2 of the filter 4 from the outlet temperature Tout of the filter 4 detected by the temperature sensor 17, and computes a temperature difference ΔT (=Tout−Tbede2). The filter outlet temperature Tout may be the highest temperature of the filter outlet during regeneration control. Specifically, the subtraction section 34 computes the temperature difference by equation (4), and stores it in the memory (e.g. RAM):

$$\Delta T = T\text{out} - T\text{bede}2 \tag{4}$$

If no particulates deposit in the filter 4 and the carrier of the filter 4 contains no oxidation catalyst, then no particulates are burnt in the filter 4 and HC, CO in the exhaust gas is not oxidized (not burnt). In this case, the estimated outlet temperature Tbede2 of the filter 4 should coincide with the actual filter outlet temperature Tout detected by the temperature sensor 17, so the temperature difference ΔT of equation (4) should be approximately zero.

However, in reality, the particulates deposited on the bed of the filter 4 during regeneration control do burn, and HC, CO in the exhaust gas burn due to the catalytic reaction by the oxidation catalyst which is supported on the carrier. Therefore, the temperature difference ΔT of equation (4) is the sum of a first temperature rise ΔT1 due to combustion of particulates in the bed of the filter 4, and a second temperature rise ΔT2 due to the oxidation reaction (combustion) of HC, CO in the exhaust gas (in other words, ΔT=ΔT1+ΔT2).

The estimated bed temperature must be recalculated as a value obtained by adding the temperature difference ΔT to the temporary bed temperature Tbed1. The addition section 35 computes a value obtained by adding the temperature difference ΔT of equation (4) to the temporary bed temperature Tbed1 as an estimated bed temperature Tbed2. In other words, the estimated bed temperature Tbed2 is computed by the equation (5):

$$T\text{bed}2 = T\text{bed}1 + \Delta T \tag{5}$$

Consequently, Tbed1 on the right-hand side of equation (2) must be transposed to Tbed2. Therefore, equation (2) can be rewritten:

$$T\text{bede}1 = T\text{bed}2 \times K2 + T\text{bede}1(\text{immediately preceding value}) \times (1-K2) \tag{2A}$$

Herein, K2 is a weighted average coefficient, and Tbede1 (immediately preceding value) is a value of Tbede1 which is calculated and stored in the immediately preceding computation of Tbede1. The weighted average section 32 computes the temporary estimated outlet temperature Tbede1 of the filter 4 by the equation (2A) from the estimated bed temperature Tbed2, and stores it in the memory (e.g. RAM).

In this way, the temperature difference ΔT between the outlet temperature Tout of the filter 4 and the estimated outlet temperature Tbede2 of the filter 4 is calculated, and by feeding this temperature difference ΔT back to the estimated bed temperature, the estimated bed temperature can be computed with high precision. Hence, a large data volume is unnecessary for computing the estimated bed temperature, and catalyst deterioration or melting damage of the filter 4 due to an abnormally high temperature during filter regeneration control can be avoided.

The processing by the weighted average sections 31 and 32, multiplication section 33, subtraction section 34 and addition section 35 is repeatedly performed at the predetermined computation interval (for example, approximately 20 microseconds).

Figure 2A:
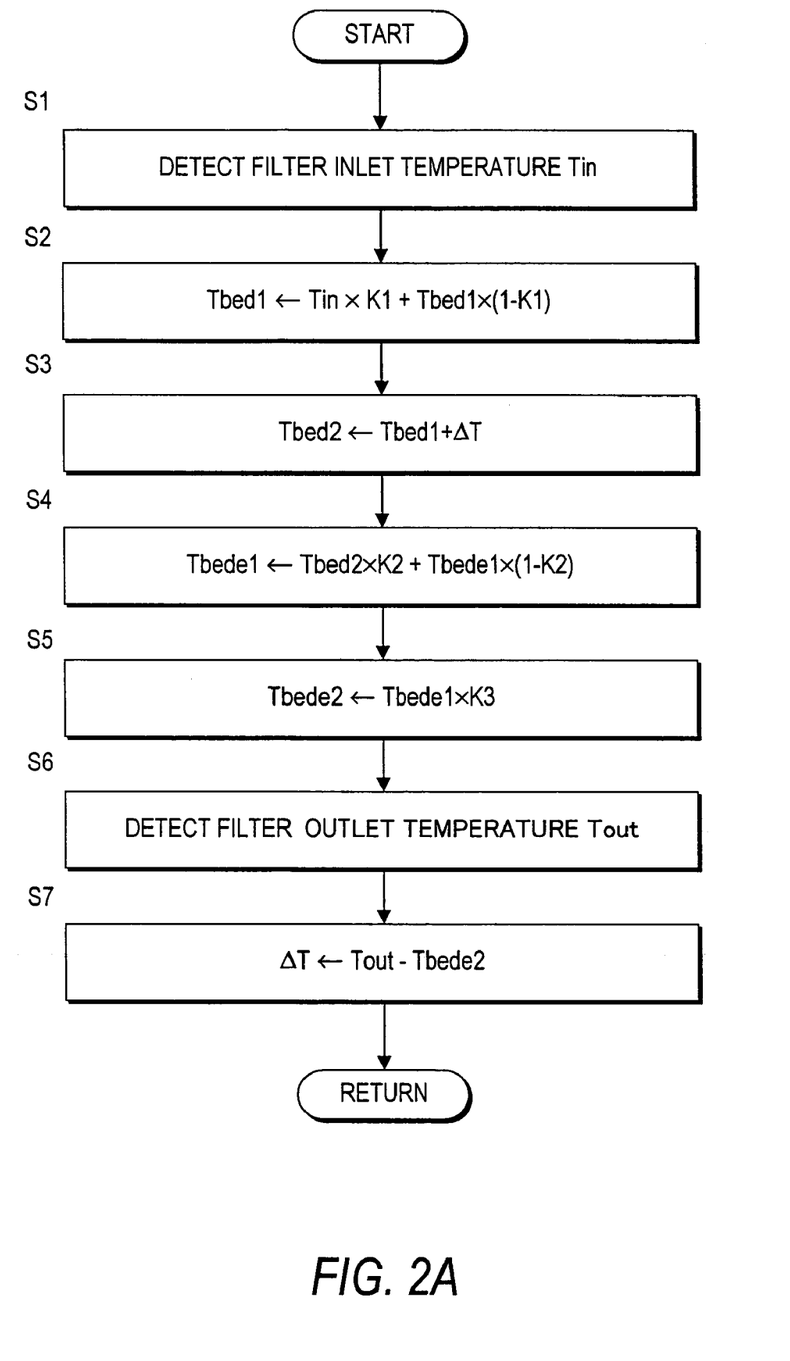
FIG. 2A is a flowchart showing an estimated bed temperature computation routine.

In FIG. 2A, the computation routine shown by the block diagram of FIG. 2 above is also shown as a flowchart. A step S2 corresponds to the calculation of the weighted average section 31, a step S3 corresponds to the calculation of the addition section 35, a step S4 corresponds to the calculation of the weighted average section 32, a step S5 corresponds to the calculation of the multiplication section 33 and a step S7 corresponds to the calculation of the subtraction section 34. The controller 11 repeats the computation routine of FIG. 2A at every predetermined computation interval.

Figure 4:
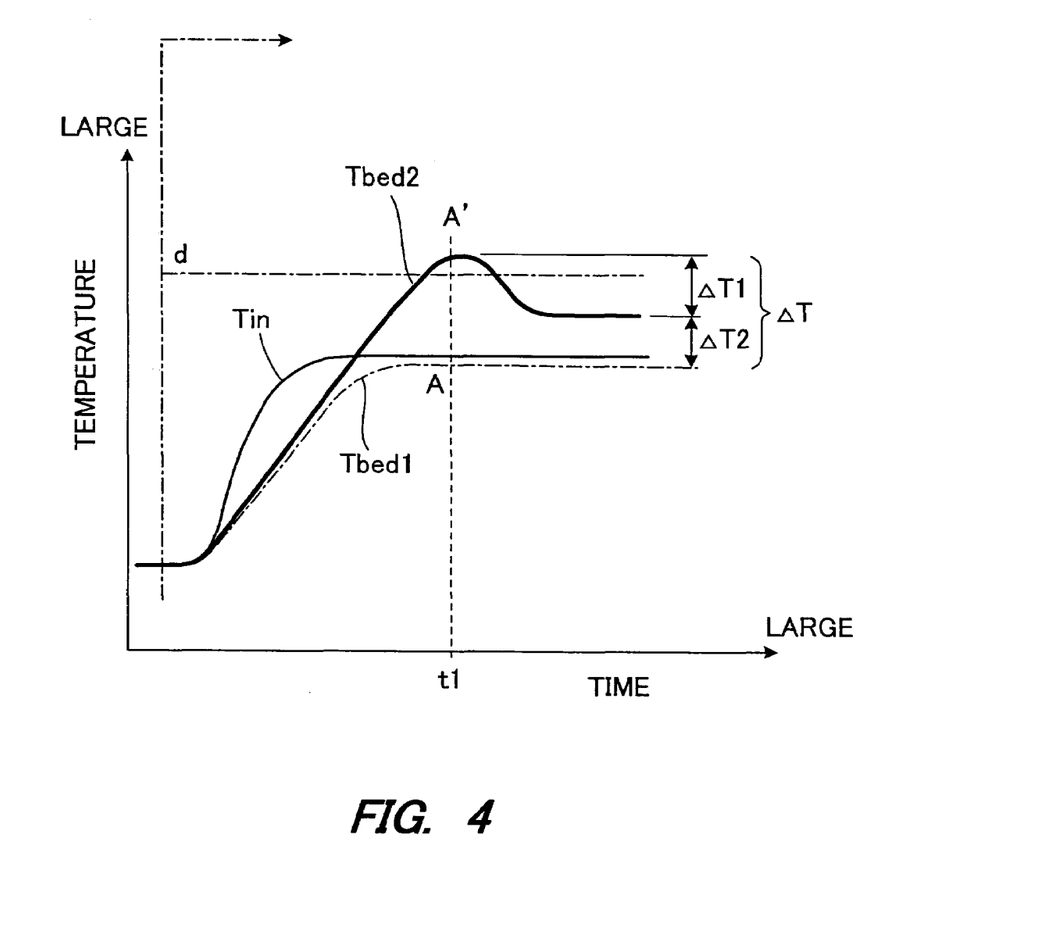
FIG. 4 is a graph showing a time variation of a computation value of the bed temperature during regeneration control.

The graph of FIG. 4 schematically shows experimental results related to the time-dependent variations of the temporary bed temperature Tbed1 and estimated bed temperature Tbed2. The graph of FIG. 4 shows the time-dependent variation from the start of regeneration control in the steady state. Herein, in the steady state or semi-steady state, the estimated bed temperature Tbed2 coincided well with the actual measured values.

Referring to FIG. 4, the estimated bed temperature Tbed2 has a peak at a timing t1 after a predetermined time from the start of regeneration control. Subsequently, the estimated bed temperature Tbed2 decreases, and the difference between the estimated bed temperature Tbed2 and temporary bed temperature Tbed1 is maintained at a constant value (ΔT2). The temperature rise ΔT1 due to combustion of particulates reaches a peak at the timing t1 when combustion of particulates is active after filter regeneration starts, then gradually decreases, and should reach zero after all particulates have been burnt. The difference between the estimated bed temperature Tbed2 and temporary bed temperature Tbed1 illustrates this phenomenon very well.

On the other hand, the fixed temperature difference (ΔT2) between the temporary bed temperature Tbed1 and estimated bed temperature Tbed2 corresponds to a second temperature increase due to reaction (combustion) of the HC, CO discharged during filter regeneration by the oxidation catalyst. In other words, the amount of HC, CO in the exhaust gas in the steady state is constant, and the estimated bed temperature Tbed2 becomes correspondingly higher than the temporary bed temperature Tbed1 by a constant value (ΔT2).

If the estimated bed temperature Tbed2 is obtained in this way, this temperature Tbed2 represents the maximum bed temperature. During regeneration control, the estimated bed temperature Tbed2 is compared with the filter critical temperature, and when the estimated bed temperature Tbed2 has the possibility to exceed the filter critical temperature, the controller 11 performs control to, for example, reduce the oxygen concentration in the exhaust gas from the engine 1. This is because the combustion temperature in the bed depends on the oxygen concentration in the exhaust gas, and for the same particulate deposition amount, the combustion temperature rises, the higher the oxygen concentration is. Decreasing the intake air amount or increasing the fuel injection amount decreases the oxygen concentration of the exhaust gas. If the opening of the variable nozzle 22 of the variable capacity turbocharger 21 is increased or the EGR ratio/EGR amount of the EGR valve 23 (EGR device) is increased, the intake air amount decreases and thus the oxygen concentration decreases.

Next, the effect of this embodiment will be described. According to this embodiment, based on the temperature characteristics of the filter 4 which are physically modeled, and the filter inlet temperature Tin (first/second temperature) and filter outlet temperature Tout (second/first temperature), the temperature of the maximum temperature position (midway position between the filter front surface 4a and filter rear surface 4b) is computed as the estimated bed temperature Tbed2. From the computed estimated bed temperature Tbed2, the temperature of the maximum temperature position including the temperature rise ΔT1 due to combustion of deposited particulates can be correctly determined regardless of the particulate deposition amount of the filter 4.

As the temperature characteristics Tbed1 of the filter 4 (i.e., the temporary bed temperature) and estimated outlet temperature Tbede1 are obtained by first-order delay processing (physical model), they are adjusted only by the weighted average coefficients K1 and K2 used for first-order delay processing. The value of K1 is determined uniquely by the heat capacity of the filter 4 from the filter front surface 4a to the maximum temperature position. The value of K2 is determined uniquely by the heat capacity of the filter 4 from the maximum temperature position to the filter rear surface 4b. In other words, K1 and K2 which are adjustment parameters are determined independently of the engine running conditions or the particulate deposition amount of the filter 4. Therefore, the large effort required to create a table or map is not required. Even if the filter specification changes, it is required only to adjust the parameters K1 and K2 according to the heat capacity of the filter after the change.

When the outside air temperature is low, the heat dissipation amount from the carrier of the filter 4 to the outside air is large. However, as the estimated outlet temperature Tbede1 is corrected according to the heat dissipation from the filter 4 to the outside air, the estimated bed temperature Tbed2 can be found with sufficient precision also in this case.

Although in this embodiment, the case was described where the carrier of the filter 4 supported an oxidation catalyst, this invention can be applied also when the carrier of the filter 4 does not support an oxidation catalyst.

The temperature of the maximum temperature position can be simply and reliably determined by using the estimated bed temperature Tbed2 regardless of whether or not there is an oxidation catalyst which purifies HC and CO in the exhaust gas, in the carrier of the filter 4. The temperature of the maximum temperature position includes the temperature rise amount ΔT1 due to oxidation of the deposited particulates and the temperature rise amount ΔT2 due to catalytic oxidation of HC and CO. Thus, even if the catalyst has deteriorated, the temperature rise amount can be found simply and reliably.

Although, in this embodiment, the case was described where the maximum temperature position was situated midway between the filter front surface 4a and filter rear surface 4b, the invention is not limited thereto.

Although, in this embodiment, the case was described where the temperature sensor 16 detected the filter inlet temperature, the filter inlet temperature may be estimated using a known method according to the running conditions of the engine.

In this embodiment, the differential temperature between the detected outlet temperature and the estimated outlet temperature Tbede2 obtained according to the delay of the filter outlet temperature relative to the filter inlet temperature, is fed back and added to the estimated bed temperature. However, this invention is not limited thereto, and the differential temperature between the detected inlet temperature and the estimated inlet temperature obtained according to the variation in the filter inlet temperature relative to the filter outlet temperature, may be fed back and added to the estimated bed temperature. In this case, the estimated bed temperature Tbed2 may be computed based on the variation of the temporary bed temperature Tbed1 due to the heat capacity of the filter 4 relative to the filter output temperature Tout and based on the difference between the detected filter inlet temperature and an estimated filter inlet temperature. A new estimated filter inlet temperature may be computed based on the variation of the filter inlet temperature Tin due to the heat capacity of the filter 4 relative to the estimated bed temperature Tbed2.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The entire contents of Japanese Patent Application P2003-422640 (filed Dec. 19, 2003) are incorporated herein by reference.

What is claimed is:

1. A regeneration control device which regenerates a filter which traps particulate matter in the exhaust gas of an engine, comprising:
    a first temperature sensor, which detects one of an upstream temperature and a downstream temperature upstream and downstream, respectively, of the filter as a first temperature;
    a second temperature sensor, which detects the other temperature as a second temperature; and
    a microcomputer programmed to:
        compute an estimated value for the second temperature based on the first temperature detected by the first temperature sensor,
        compute an estimated bed temperature of the filter based on the difference of the second temperature detected by the second temperature sensor and the estimated value for the second temperature, and
        perform engine control for increasing the temperature of the exhaust gas based on the estimated bed temperature.

2. The regeneration control device as defined in claim 1, wherein the first temperature is a filter inlet temperature, and the second temperature is a filter outlet temperature.

3. The regeneration control device as defined in claim 2, wherein the microcomputer is programmed to:
    compute the estimated bed temperature, based on a variation delay of the estimated bed temperature relative to the filter inlet temperature, and
    compute an estimated filter outlet temperature, based on a variation delay of the estimated filter outlet temperature relative to the estimated bed temperature.

4. The regeneration control device as defined in claim 3, wherein the microcomputer computes a temporary estimated filter outlet temperature at a predetermined computation interval ignoring heat dissipation from the filter, and
    wherein the microcomputer is further programmed to:
        compute a new temporary estimated filter outlet temperature from the weighted average of the temporary estimated filter outlet temperature computed on a preceding occasion and the estimated bed temperature, and
        compute a new estimated filter outlet temperature from the new temporary estimated filter outlet temperature.

5. The regeneration control device as defined in claim 4, wherein the temporary estimated filter outlet temperature varies relative to the estimated bed temperature with a first-order delay.

6. The regeneration control device as defined in claim 3, wherein the microcomputer computes a temporary bed temperature of the filter at a predetermined computation interval, the temporary bed temperature not including a temperature rise amount due to a chemical reaction, and
wherein the microcomputer is further programmed to:
compute a new temporary bed temperature from the weighted average of the temporary bed temperature computed on a preceding occasion and the detected filter inlet temperature, and
compute a new estimated bed temperature of the filter, based on the new temporary bed temperature, the detected filter outlet temperature and the estimated filter outlet temperature.

7. The regeneration control device as defined in claim 6, wherein the temporary bed temperature varies relative to the filter inlet temperature with a first-order delay.

8. The regeneration control device as defined in claim 4, wherein the estimated filter outlet temperature is obtained by multiplying the heat dissipation coefficient according to heat dissipation from the filter to an outside air, by the temporary estimated filter outlet temperature.

9. The regeneration control device as defined in claim 1, wherein the microcomputer is further programmed to perform regeneration control while maintaining the estimated bed temperature less than a filter critical temperature.

10. The regeneration control device as defined in claim 1, comprising an oxidation catalyst which oxidizes HC and CO in the exhaust gas, in the filter.

11. The regeneration control device as defined in claim 1, wherein the first temperature is a filter outlet temperature, the second temperature is a filter inlet temperature, and
wherein the microcomputer is further programmed to:
compute the estimated bed temperature, based on a variation of the estimated bed temperature relative to the filter output temperature and the difference between the detected filter inlet temperature and an estimated filter inlet temperature, and
compute a new estimated filter inlet temperature, based on a variation of the estimated filter inlet temperature relative to the estimated bed temperature.

12. The regeneration control device as defined in claim 2, wherein the filter outlet temperature is the highest temperature of the filter outlet during regeneration control.

13. The regeneration control device as defined in claim 1, wherein the first temperature sensor detects a filter inlet temperature and the second temperature sensor detects a filter outlet temperature; and
wherein the microcomputer is further programmed to:
compute the estimated bed temperature of the filter based on the filter inlet temperature detected by the first temperature sensor,
correct the estimated bed temperature of the filter based on an estimated filter outlet temperature which is estimated from the detected filter inlet temperature detected by the first temperature sensor and the detected filter outlet temperature detected by the second temperature sensor.

14. A regeneration control device which regenerates a filter which traps particulate matter in the exhaust gas of an engine, comprising:
first sensor means for detecting one of an upstream temperature and a downstream temperature upstream and downstream, respectively, of the filter as a first temperature;
second sensor means for detecting the other temperature as a second temperature;
means for computing an estimated value for the second temperature based on the first temperature detected by the first sensor means;
means for computing an estimated bed temperature of the filter based on the difference of the second temperature detected by the second sensor means and the estimated value for the second temperature; and
means for engine control for increasing the temperature of the exhaust gas based on the estimated bed temperature.

15. A regeneration control method for regenerating a filter which traps particulate matter in the exhaust gas of an engine, comprising:
detecting one of an upstream temperature and a downstream temperature upstream and downstream, respectively, of the filter as a first temperature;
detecting the other temperature as a second temperature;
computing an estimated value for the second temperature based on the first temperature detected;
computing an estimated bed temperature of the filter based on the difference of the second temperature detected and the estimated value for the second temperature; and
performing engine control for increasing the temperature of the exhaust gas based on the estimated bed temperature.

* * * * *